United States Patent
Suzuki

Patent Number: 6,075,646
Date of Patent: Jun. 13, 2000

[54] OBSERVATION OPTICAL APPARATUS

[75] Inventor: Toshinobu Suzuki, Hachioji, Japan

[73] Assignee: Olympus Optical Co., Ltd., Tokyo, Japan

[21] Appl. No.: 09/196,201

[22] Filed: Nov. 20, 1998

Related U.S. Application Data

[62] Division of application No. 08/583,615, Jan. 5, 1996, abandoned.

[30] Foreign Application Priority Data

Jan. 9, 1995 [JP] Japan .................................. 7-001371

[51] Int. Cl.$^7$ ............................ G03B 13/06; G02B 21/06
[52] U.S. Cl. ............................ 359/434; 359/368; 359/380
[58] Field of Search ................................. 359/362–363, 359/368–390, 422, 434–435

[56] References Cited

U.S. PATENT DOCUMENTS

| | | | |
|---|---|---|---|
| 2,479,792 | 8/1949 | Tackaberry | 359/422 |
| 3,438,689 | 4/1969 | Wehr | 359/432 |
| 3,549,200 | 12/1970 | Kab et al. | 359/380 |
| 3,603,726 | 9/1971 | Garber | 359/432 |
| 4,159,864 | 7/1979 | Yasukua et al. | 359/740 |
| 4,525,037 | 6/1985 | Hetabi | 359/740 |
| 4,530,578 | 7/1985 | Kato | 359/381 |
| 4,548,481 | 10/1985 | Yamada | 359/379 |
| 4,803,352 | 2/1989 | Bierleutgeb | 359/380 |
| 4,840,474 | 6/1989 | Heft et al. | 359/434 |
| 5,132,837 | 7/1992 | Kitajima | 359/368 |
| 5,729,385 | 3/1998 | Nishida et al. | 359/434 |
| 5,777,783 | 7/1998 | Endou et al. | 359/363 |
| 5,808,791 | 9/1998 | Kawano et al. | 359/363 |
| 5,835,266 | 11/1998 | Kitajima | 359/368 |

FOREIGN PATENT DOCUMENTS

| | | | |
|---|---|---|---|
| 1-28611 | 1/1989 | Japan . | |
| 2-264911 | 10/1990 | Japan | 359/380 |
| 2-281223 | 11/1990 | Japan . | |
| 3-81715 | 4/1991 | Japan | 359/380 |
| 4-3291 | 2/1992 | Japan . | |
| 5-127096 | 5/1993 | Japan . | |

*Primary Examiner*—Thong Nguyen
*Attorney, Agent, or Firm*—Pillsbury Madison & Sutro LLP

[57] ABSTRACT

An observation optical apparatus includes an objective unit; the first path splitting member placed on the optical axis of the objective unit for splitting an optical path from the objective unit into two; the first optical system situated on one of two optical paths split by the first path splitting member, for forming an image at least twice; the first observation device-located at the imaging position of the first optical system; the second optical system situated on the other of the two optical paths, having a higher total magnification and a larger numerical aperture than the first optical system; the second observation device located at the imaging position of the second optical system; and a stop for low magnification, placed at the pupil position of the first optical system, for reducing the numerical aperture.

14 Claims, 4 Drawing Sheets

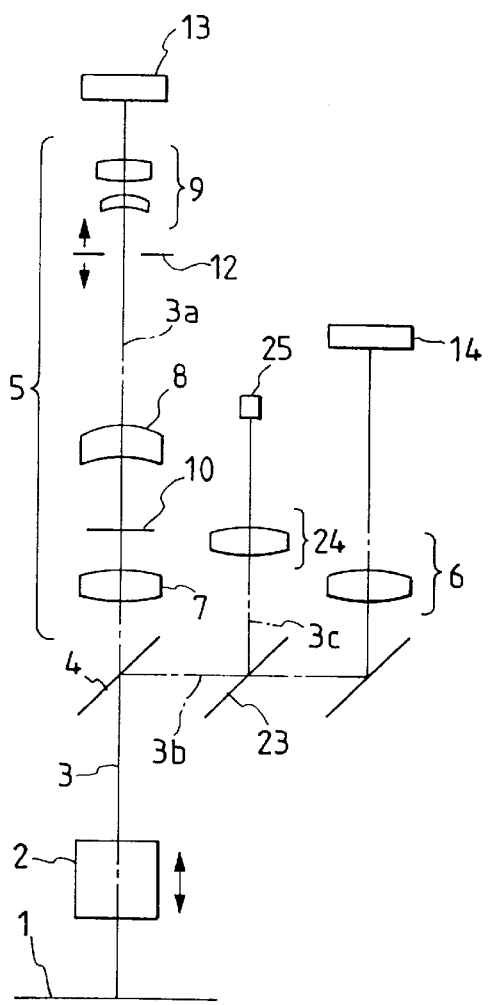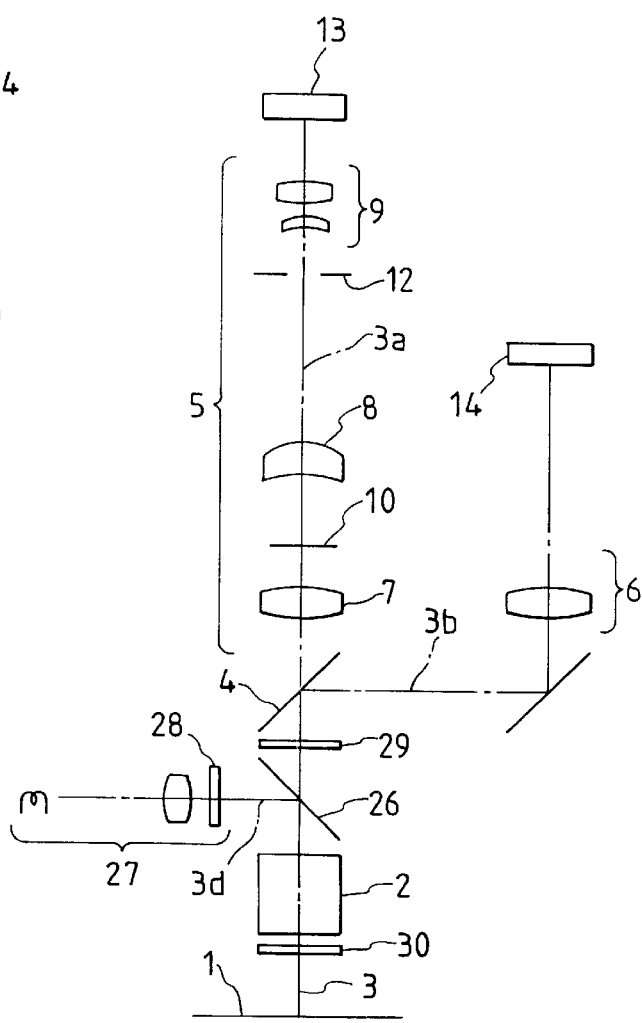
FIG. 6
FIG. 7

OBSERVATION OPTICAL APPARATUS

This is a division of application Ser. No. 08/583,615, filed Jan. 5, 1996, now abandoned.

BACKGROUND OF THE INVENTION

1. Field of the Invention

This invention relates to a variable magnification optical apparatus, and in particular, to an optical apparatus in which an image of an object is formed with a magnification different from a predetermined magnification to thereby perform various measurements of the object to be inspected.

2. Description of Related Art

A variety of variable magnification optical apparatuses have been proposed in the past. Japanese Utility Model Publication No. Hei 4-3291, for example, is directed to a variable magnification optical system which does not cause the shift of an optical axis, namely optical misalignment, by a change of magnification, and discloses a variable magnification optical apparatus equipped with a fixed objective lens, two relay lenses of different magnifications, an imaging plane, and shutters for selectively blocking two optical paths.

Japanese Patent Preliminary Publication No. Hei 2-281223, for the purpose of facilitating a change of magnification for observation without replacing an objective lens, discloses an observation optical apparatus equipped with a fixed objective system of a constant magnification and a variable magnification optical system for changing the magnification of an observation image formed by the objective system to a predetermined magnitude.

Japanese Patent Preliminary Publication No. Sho 64-28611, for the purpose of keeping the alignment of an optical system even when a magnification is changed, discloses a variable magnification optical apparatus having an objective lens, two relay lenses of different magnifications, a member for making the optical axes of the two relay lenses coincide with the position of an image, and insertable blocking members for blocking two optical paths.

Further, Japanese Patent Preliminary Publication No. Hei 5-127096 refers to an ultraviolet microscope and discloses a technique for separating an optical image of an object formed by an objective lens into two, an ultraviolet image and a visible image, and providing the first observation means for observing the ultraviolet image and the second observation means for observing the visible image so that the variable magnification lens systems of the first and second observation means can be set to different magnifications.

In general, an objective lens is such that its numerical aperture (NA) increases with increasing magnification to enhance a resolving power. The above-mentioned prior art relative to variable magnification systems does not refer to the NA in connection with the magnitude of magnification in observation. It is therefore considered that each of the conventional variable magnification optical systems used the same NA, notably a small NA, at high and low magnifications. This is because if a large NA is set and a wide field is observed at a low magnification, the large NA can be obtained at the center of the visual field, but not in the periphery thereof, with the result that the amount of marginal light becomes insufficient. Thus, to avoid this difficulty, a smaller NA must be set.

Where the visual field is observed at a low magnification, a small NA does not cause any problem, while at a high magnification, the problem is produced that if the NA is small, resolving power becomes insufficient.

SUMMARY OF THE INVENTION

It is, therefore, an object of the present invention to provide an observation optical apparatus in which, at a low magnification, a wide field can be observed with a small NA, while at a high magnification, the visual field, although narrow, can be observed with a larger NA, that is, with a higher resolving power, In order to achieve this object, according to one aspect of the present invention, the observation optical apparatus includes an objective unit; a first path splitting member disposed on the optical axis of the objective unit, for splitting an optical path from the objective unit into two; a first optical system disposed on one of the two split paths, having a low total magnification for forming an image at least twice; a first observation means situated at the imaging position of the first optical system; a second optical system disposed on the other split path, having a higher total magnification and a larger NA than in the first optical system; a second observation means situated at the imaging position of the second optical system; and a low magnification stop placed at a pupil position in the first optical system, for reducing the NA.

In this observation optical apparatus, light originating from an object passes through the objective unit and is split into two light components by the first path splitting member. One of the two light components traverses the first optical system so that a wide field is observed with a low magnification and a small NA by the first observation means corresponding to the first optical system. The other light component passes through the second optical system and the observation of a high resolving power is made with a higher magnification and a larger NA by the second observation means corresponding to the second optical system. In this way, the use of a single objective unit makes it possible to perform the observation of a wide field with a low magnification and a small NA simultaneously with the observation of a high resolving power with a higher magnification and a larger NA.

According to another aspect of the present invention, the observation optical apparatus is equipped with an objective unit; a variable magnification optical system situated on the image side of the objective unit, for changing the magnification of an image of an object to a predetermined magnitude; and a variable stop disposed at the pupil position of the objective unit. The aperture diameter of the variable stop is designed so that when the total magnification is high, the NA is increased, while it is low, the NA is reduced.

By changing the diameter of the variable stop in accordance with the magnitude of the total magnification, the use of a single objective unit makes it possible to perform the observation of a wide field with a low magnification and a small NA simultaneously with the observation of a high resolving power with a higher magnification and a larger NA. Also, the change of magnification of the variable magnification optical system may be made by either a zoom system or a turret system. Moreover, the image may also be formed once or twice.

According to still another aspect of the present invention, the observation optical apparatus has an objective unit; a variable magnification relay optical system situated at the image side of the objective unit, for forming an image of an object, at least twice, obtained by the objective unit to change a magnification to a predetermined magnitude; a variable stop located at a pupil position on the image side of the position of an intermediate image. The aperture diameter of the variable stop is designed so that when the total magnification is high, the NA is increased, while it is low, the NA is reduced.

In this aspect also, as described above, by changing the diameter of the variable stop in accordance with the magnitude of the total magnification, the use of a single objective unit makes it possible to perform the observation of a wide field with a low magnification and a small NA simultaneously with the observation of a high resolving power with a higher magnification and a larger NA.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 6 is a schematic view showing an optical arrangement of a fifth embodiment of the observation optical apparatus according to the present invention; and FIG. 7 is a schematic view showing an optical arrangement of a sixth embodiment of the observation optical apparatus according to the present invention.

DETAILED DESCRIPTION OF THE PREFERRED EMBODIMENTS

Figure 1:
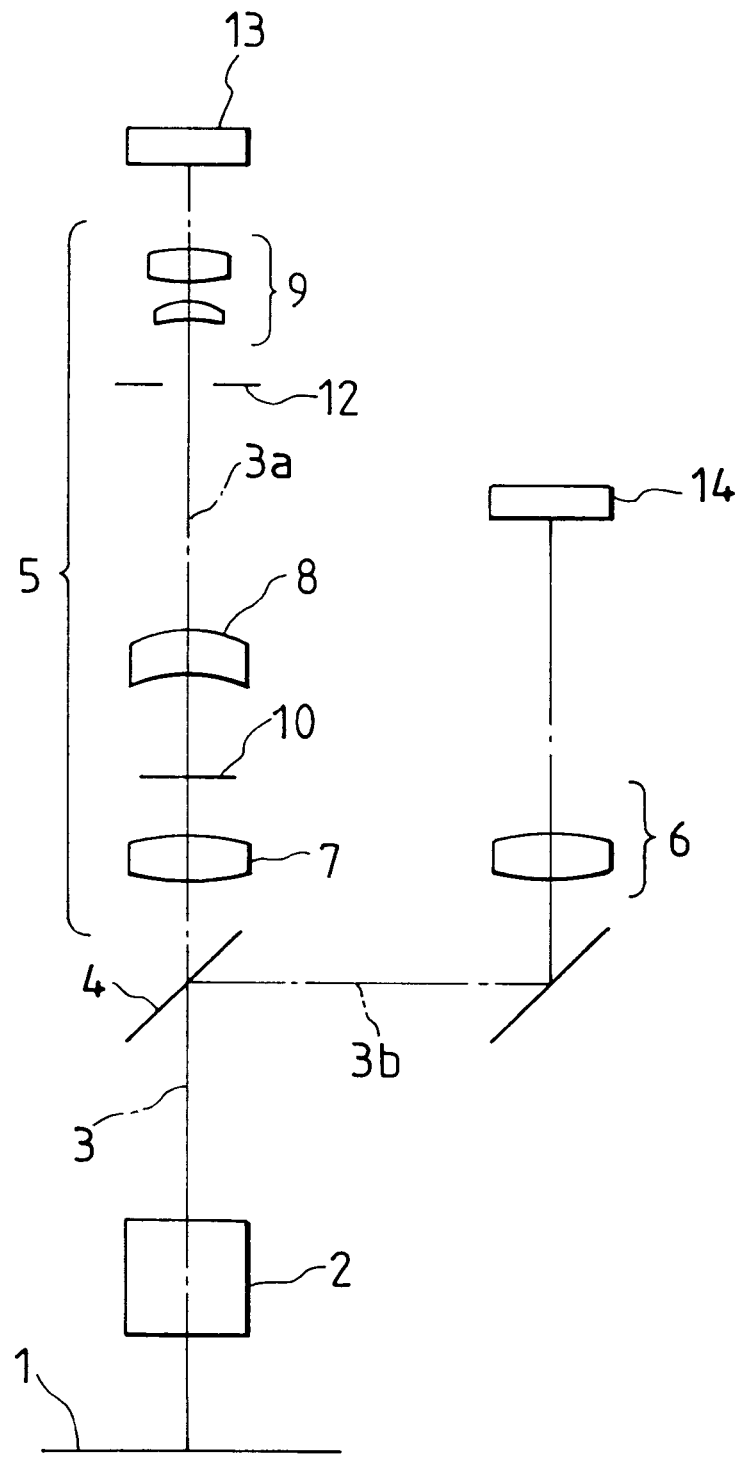
FIG. 1 is a schematic view showing an optical arrangement of a first embodiment of the observation optical apparatus according to the present invention.
Figure 2A:
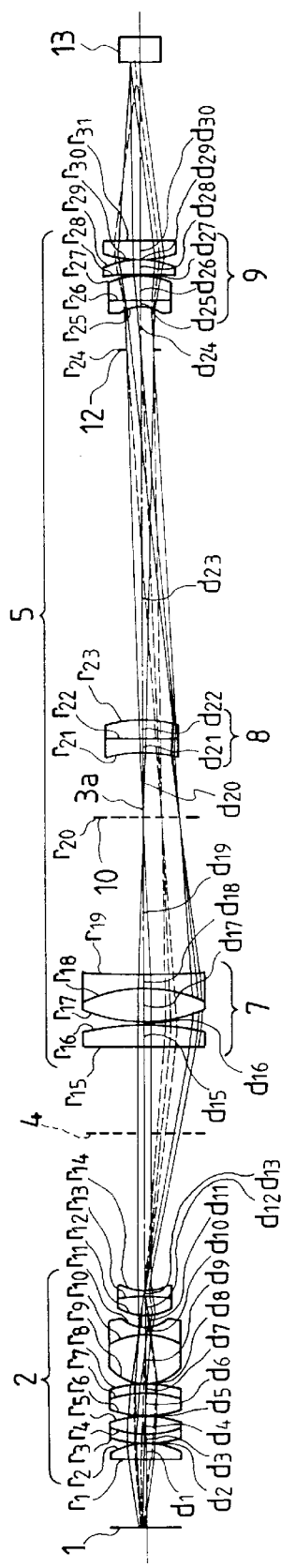
FIGS. 2A and 2B are schematic views sho-wing optical arrangements, developed along respective optical axes, where the optical arrangement of the first embodiment is separated into two.
Figure 2B:
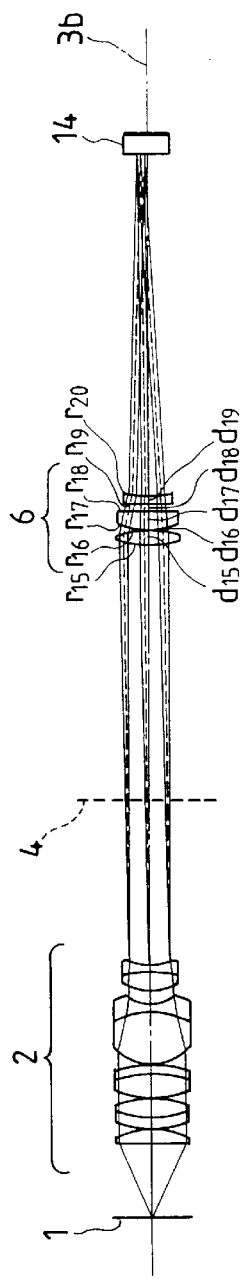

FIGS. 1, 2A, and 2B show the first embodiment of the observation optical apparatus of the present invention. An objective unit 2 is disposed opposite to an object 1. A half mirror 4 is placed, as a first path splitting member, on an optical axis 3 of the objective unit 2. A first optical system 5 is situated on an optical path 3a (one of two optical paths, split by the half mirror 4). A second optical system 6 is located on the other optical path 3b split by the mirror 4. The first optical system 5 is such that an image of the object 1 is formed at least twice and the total magnification is low. The second optical system 6 has a high magnification and a large NA.

The first optical system 5, as shown in FIG. 2A, is constructed with a relay optical system including a first lens unit 7, a second lens unit 8, and a third lens unit 9. Each of the first lens unit 7 and the third lens unit 9 has a positive refracting power. The first lens unit 7, usually called a field lens, performs the function of converging a beam of light. Since the first optical system 5 is designed to form the image at least twice, an intermediate image is first formed by the first lens unit 7 with a positive refracting power. The second lens unit 8 includes a meniscus lens with the concave side facing the object 1 through an intermediate image position 10 where the intermediate image is formed. The intermediate image is relayed by the second lens unit 8 and the third lens unit 9 so that the second image formation is performed, and an image magnification is further reduced.

Between the second lens unit 8 and the third lens unit 9, a pupil is formed by the second unit lens 8. A stop 12 is placed at the position of the pupil, and has the function of limiting the light beam to a small NA for low magnification. At the image position of the first optical system 5, a first observation means 13 is situated. The first observation means 13 is well known and includes, for example, a ½-inch CCD camera. Similarly, as shown in FIG. 2B, a second observation means 14 having the same construction as the first observation means 13 is located at the image position of the second optical system 6.

The observation optical apparatus according to the first embodiment functions as follows: Light emitted from a proper source of light (not shown) and reflected by the object 1 passes through the objective unit 2 and is split into two optical paths by the half mirror 4. Split light following the optical path 3a is reduced in magnification by the first optical system 5 and is limited to a small NA by the stop 12. The split light following the optical path 3a then transverses the third lens unit 9 and is observed with a low magnification and a small NA by the first observation means 13. On the other hand, the other split light following the optical path 3b through the second optical system 6 is observed with a higher magnification and a larger NA by the second observation means 14. In this way, the use of a single objective unit makes it possible to perform the observation of a wide field with a low magnification and a small NA simultaneously with the observation of a high resolving power with a higher magnification and a larger NA.

The following is an example of the lens data of the objective unit 2, the first optical system 5, and the second lens system 6.

[Objective lens]

$r_1 = -3091.4265$
$\quad d_1 = 7.0000 \quad n_1 = 1.88300 \quad v_1 = 40.78$
$r_2 = -36.2706$
$\quad d_2 = 1.1591$
$r_3 = 175.0000$
$\quad d_3 = 3.8750 \quad n_3 = 1.74000 \quad v_3 = 31.71$
$r_4 = 29.4149$
$\quad d_4 = 9.5000 \quad n_4 = 1.45600 \quad v_4 = 90.31$
$r_5 = -69.2060$
$\quad d_5 = 0.7500$
$r_6 = 130.0000$
$\quad d_6 = 9.7000 \quad n_6 = 1.45600 \quad v_6 = 90.31$
$r_7 = -37.6007$
$\quad d_7 = 3.8750 \quad n_7 = 1.74000 \quad v_7 = 31.71$
$r_8 = -150.0000$
$\quad d_8 = 0.7650$
$r_9 = 21.9699$
$\quad d_9 = 21.8609 \quad n_9 = 1.49700 \quad v_9 = 81.61$
$r_{10} = -34.3172$
$\quad d_{10} = 4.2500 \quad n_{10} = 1.64450 \quad v_{10} = 40.82$
$r_{11} = 14.1316$
$\quad d_{11} = 5.8713$
$r_{12} = 20.7081$
$\quad d_{12} = 8.8500 \quad n_{12} = 1.80518 \quad v_{12} = 25.43$
$r_{13} = -99.8331$
$\quad d_{13} = 2.5000 \quad n_{13} = 1.66998 \quad v_{13} = 39.27$
$r_{14} = 22.0184$

[First optical system]

$r_{15}=\infty$
$\quad d_{15}=10.0000\ n_{15}=1.57133\ v_{15}52.92$
$r_{16}=-134.3710$
$\quad d_{16}=2.0000$
$r_{17}=75.3320$
$\quad d_{17}=14.0000\ n_{17}=1.69350\ v_{17}=53.23$
$r_{18}=-96.6849$
$\quad d_{18}=8.5000\ n_{18}=1.80518\ v_{18=25.43}$
$r_{19}=532.9434$
$\quad d_{19}=74.0150$
$r_{20}=\infty$
$\quad d_{20}=30.7839$
$r_{21}=-44.5487$
$\quad d_{21}=6.5000\ n_{21}=1.78650\ v_{21}=50.00$
$r_{22}=\infty$
$\quad d_{22}=10.2000\ n_{22}=1.80518\ v_{22}=25.43$
$r_{23}=-54.1067$
$\quad d_{23}=173.6988$
$r_{24}=\infty$
$\quad d_{24}=20.0000$
$r_{25}=-18.8543$
$\quad d_{25}=3.0000\ n_{25}=1.75520\ v_{25}=27.51$
$r_{26}=1806.6668$
$\quad d_{26}=11.0000\ n_{26}=1.45600\ v_{26=90.31}$
$r_{27}=-26.7759$
$\quad d_{27}=1.0000$
$r_{28}=-202.5286$
$\quad d_{28}=7.0000\ n_{28}=1.69350\ v_{28}=53.23$
$r_{29}=-39.6074$
$\quad d_{29}=1.0000$
$r_{30}=126.4046$
$\quad d_{30}=9.0000\ n_{30}=1.83400\ v_{30}=37.17$
$r_{31}=-236.7358$

[Second optical system]

$r_{15}=39.8020$
$\quad d_{15}=6.3000\ n_{15}=1.48749\ v_{15}=70.21$
$r_{16}=14122.7431$
$\quad d_{16}=0.5000$
$r_{17}=38.1671$
$\quad d_{17}=8.0000\ n_{17}=1.49700\ v_{17}=81.61$
$r_{18}=-2533.7456$
$\quad d_{18}=4.0000$
$r_{19}=-165.5936$
$\quad d_{19}=2.7000\ n_{19}=1.67003\ v_{19}=47.25$
$r_{20}=26.2271$ In the lens data mentioned above, $r_n$ (n=1–31) represents the radius of curvature of each lens surface, $d_n$ (n=1–30) represents the thickness of each lens or space therebetween, $n_n$ (n=1–30) represents the refractive index of each lens, and $v_n$ (n=1–30) represent the Abbe's number of each lens.

The distance between the objective unit 2 and the first optical system 5 is 110 mm, the distance between the objective unit 2 and the second optical system 6 is 186 mm, and the working distance of the objective unit 2 is 32.53 mm. The combination of the objective unit 2 and the first optical system 5 provides an NA of 0.12, a magnification of 1.1×, a stop diameter of 12 mm, and a field number of 9. On the other hand, the combination of the objective unit 2 and the second optical system 6 provides an NA of 0.4, a magnification of 10×, and a field number of 9.

Figure 3:
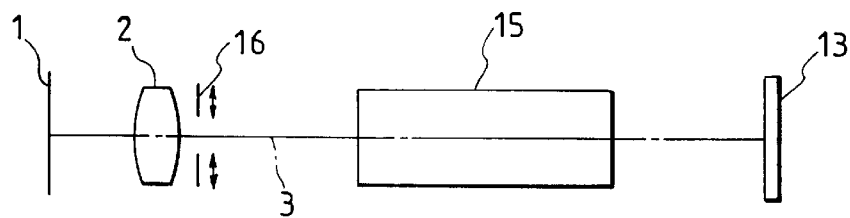
FIG. 3 is a schematic view showing an optical arrangement of a second embodiment of the observation optical apparatus according to the present invention.

FIG. 3 shows the second embodiment of the observation optical apparatus according to the present invention. In this embodiment, on the image side of the objective unit 2 located opposite to the object 1, a variable magnification optical system 15 is provided on the optical axis 3 of the objective unit 2. A change of magnification of the variable magnification optical system 15 may be made by either a zoom system or a turret system. Moreover, the image may also be formed once or twice. A variable stop 16 is placed at the pupil position of the objective unit 2. The aperture diameter of the variable stop 16 is changed so that when the total magnification combination is high, the NA is increased, while when it is low, the NA is reduced. The observation means 13 identical with that of the first embodiment is located at the image position of the variable magnification optical system 15.

In the second embodiment, the diameter of the variable stop 16 is varied in response to the magnitude of the total magnification of the variable magnification optical system 15. As such, the use of only one objective unit 2 makes it possible to make the observation of a wide field with a low magnification and a small NA and the observation of a high resolving power with a higher magnification and a larger NA.

Figure 4:
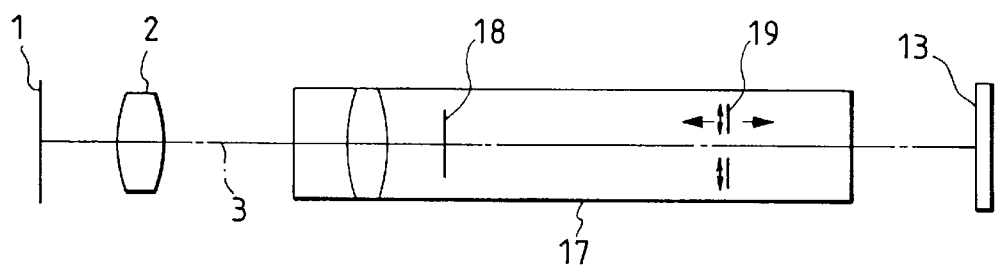
FIG. 4 is a schematic view showing an optical arrangement of a third embodiment of the observation optical apparatus according to the present invention.

FIG. 4 shows the third embodiment of the observation optical apparatus according to the present invention. This embodiment is equipped with a variable magnification relay optical system 17 which is provided on the optical axis 3 of the objective unit 2, on the image side of the objective unit 2 placed opposite to the object 1. The variable magnification relay optical system 17 is such that the image of the object 1 is formed at least twice on the image side of the objective unit 2 and the magnification of the image of the object 1 is changed to a predetermined magnitude. A variable stop 19 is placed at the image position on the image side of an intermediate image position 18 of an intermediate image formed in the variable magnification relay optical system 17. The aperture diameter of the variable stop 19 can be arbitrarily changed. Moreover, the variable stop 19 is designed to be movable along the optical axis 3. The observation means 13 identical with that of the first embodiment is located at the image position of the variable magnification relay optical system 17.

In the third embodiment, the aperture diameter of the variable stop 19 is varied in response to the magnitude of the total magnification of the variable magnification relay optical system 17. That is, the diameter of the variable stop 19 is changed so that when the total combination is high, the NA is increased, while when it is low, the NA is reduced. As such, the use of only one objective unit 2 makes it possible to make the observation of a wide field with a low magnification and a small NA and the observation of a high resolving power with a higher magnification and a larger NA. Furthermore, the variable stop 19 can be moved along the optical axis 3 in association with the shift of the pupil position caused by a change of magnification. Where the stop remains fixed, an off-axis beam is liable to be vignetted. This vignetting, however, can be prevented when the stop is moved along the optical axis.

Figure 5:
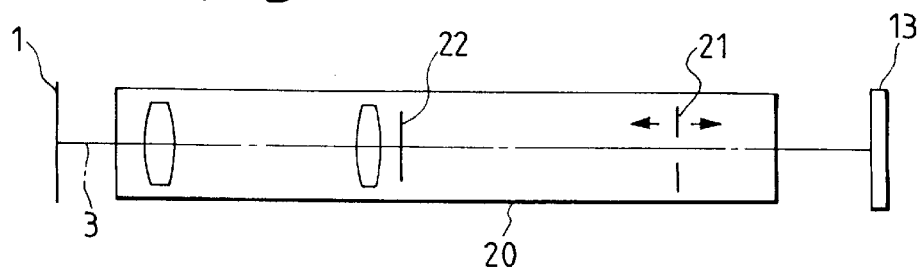
FIG. 5 is a schematic view showing an optical arrangement of a fourth embodiment of the observation optical apparatus according to the present invention.

FIG. 5 shows the fourth embodiment of the observation optical apparatus of the present invention. In this embodiment, an zoom objective unit 20 is disposed opposite to the object 1. The image of the object 1 is magnified by the zoom objective unit 20 and formed at least once therein. At the pupil position of the zoom objective unit 20 is placed a variable stop 21, the aperture diameter of which can be arbitrarily changed. Moreover, the variable stop 21 is designed to be movable along the optical axis 3. Also, the variable atop 21 may be situated on the image side of an intermediate image position 22 in the zoom objective unit 20. The observation means 13 identical with that of the first embodiment is placed at the image position of the zoom objective unit 20.

In the fourth embodiment, the aperture diameter of the variable stop 21 is varied in accordance with the magnitude of the total magnification of the zoom objective unit 20. That is, the diameter of the variable stop 21 is changed so that when the total combination is high, the NA is increased, while when it is low, the NA is reduced. This allows the observation of a wide field with a low magnification and a small NA and the observation of a high resolving power with a high magnification and a large NA. Furthermore, the variable stop 21 can be moved along the optical axis 3 in association with the shift of the pupil position caused by a change of magnification. Where the stop remains fixed, an off-axis beam is liable to be vignetted. This vignetting, however, can be prevented when the stop is moved along the optical axis.

FIG. 6 shows the fifth embodiment which is one modification of the first embodiment. In this figure, like numerals indicate like elements with respect to FIGS. 1, 2A, and 2B, and their detailed explanations are omitted. The objective unit 2 in the fifth embodiment is an infinite objective and is designed to be movable along the optical axis 3. The second optical system 6 is constructed with an imaging lens. A half mirror 23 is disposed, as a second path splitting member, on the Optical path 3b between the half mirror 4, as the first path splitting member, and the second optical system 6, and splits the optical path 3b into two. A third optical system 24 for automatic focus detection is situated on an optical path 3c of one of the two split paths. Further, an infrared light source 25 is disposed on the optical path 3c to irradiate the object 1 with infrared rays through the third optical system 24. Moreover, in the fifth embodiment, the stop 12 located on the optical path 3a is designed to be movable along the optical path 3a.

The third optical system 24 is constructed by providing the half mirror 23 as the second path splitting member between the half mirror 4, as the first path splitting member, and the second optical system 6. This is because if the half mirror 23 is placed between the half mirror 4 and the first optical system 5, the diameter of the light beam becomes extremely large, so that the outer diameter of the field lens of the first optical system 5 must be increased and correction for aberration becomes difficult. In contrast to this, the second optical system 6 is designed for infinity, and thus is not adversely affected even though the distance between the objective unit 2 and the imaging lens is somewhat increased.

Infrared light from the infrared light source 25, after passing through the third optical system 24, the half mirror 23, the half mirror 4, and the objective unit 2, is reflected by the inspecting surface of the object 1 and follows the same path to return to the infrared light source 25. A focus detecting device (not shown) connected to the infrared light source 25 is made to form an image from the reflected light, finds a focusing state, and detects the distance between the object 1 and the objective unit 2. In accordance with the distance thus detected, the position of the objective unit 3 can be adjusted automatically.

When the objective unit 2 is moved to focus automatically, the pupil position of the first optical system 5 will be shifted. In response to the shift of the pupil position, the stop 12 can also be move along the optical axis 3a. Specifically, it is merely necessary that where the distance between the objective unit 2 and the first optical system 5 is reduced, the stop 12 is move toward the image plane, while where the distance is increased, the stop 12 is moved toward the object 1.

In this way, the optical path 3c for automatic focus detection has the function of projecting infrared light on the inspecting surface of the object 1 and of detecting the amount of light reflected from this surface. Moving the objective unit 2 along the optical axis 3c to focusing automatically is based on the reason that the objective unit 2 is designed for infinity. Light emerging from the objective unit 2 is parallel, and therefore, even when the distance between the objective unit 2 and the second optical system 6 of the imaging lens is changed due to automatic focusing, the image position remains unchanged and imaging performance is not adversely affected.

In the fifth embodiment, like the first embodiment, the first optical system 5 includes the first lens unit 7 with a positive refracting power, the second lens unit 8 having a meniscus lens with the concave side facing the object 1 through the intermediate image position 10 to form the pupil, the stop 12 placed at the position of the pupil, and the third lens unit 9 with a positive refracting power. When the objective unit 2 is moved along the optical axis 3a to focus automatically, the distance between the objective unit 2 and the first optical system 5 is changed. In keeping with this, the pupil position located in the first optical system 5 is also changed. Thus, if the position where the stop 12 is placed is fixed, the pupil position will not coincide with the position of the stop. As the amount of this shift is increased, an off-axis beam becomes liable to be vignetted. To avoid this difficulty, the meniscus lens directing the concave surface toward the object 1 is provided as the second lens unit 8 to minimize an angle making the off-axis beam with the optical axis in the vicinity of the position of the stop.

FIG. 7 shows the sixth embodiment which is another modification of the first embodiment. In this figure, like numerals indicate like elements with respect to FIGS. 1, 2A, and 2B, and their detailed explanations are omitted. In the sixth embodiment, a half mirror 26 is placed, as the third path splitting member, on the optical axis 3 between the objective unit 2 and the half mirror 4, and separates an optical path 3d from the optical path 3. A fourth optical system 27 for coaxial vertical illumination is situated on the optical path 3d.

A first polarizing plate 28 is placed at the position, closest to the half mirror 26, of the fourth optical system 27, and a second polarizing plate 29 is located between the half mirror 26 and the half mirror 4. Further, between the object 1 and the objective unit 2, a depolarizing plate 30 is mounted at the top of the objective unit 2. Also, it is possible to mount either a wave plate or a ¼ wave plate, instead of the depolarizing plate 30.

In the sixth embodiment, the use of the first and second polarizing plates 28 and 29 and the depolarizing plate 30 makes it possible to eliminate flare caused by the surface reflection of the objective unit 2. The sixth embodiment, as in the first embodiment, is capable of making observations with a high magnification and a large NA and with a low magnification and a small NA through a single objective unit. As such, it is required that the objective unit 2 is designed for large NA. In general, when vertical illumination light is reflected by each lens surface of an objective unit and the reflected light reaches the surface of an image, the contrast of the image is reduced. Where two objective units for high and low magnifications are available, it is possible that, in order to prevent the reduction of contrast, each of the objective units is designed so that flare light from each surface of the objective unit is not produced.

When using only one objective unit, as in this embodiment, it is difficult to design the objective unit to eliminate flare. This is true for observations under high and low magnifications. Hence, in order to prevent the production of flare light and improve contrast, the optical arrangement such as that shown in the sixth embodiment is effective.

What is claimed is:

1. An observation optical apparatus comprising:

an objective unit;

a first path splitter disposed on an optical axis of said objective unit, constructed to split an optical path from said objective unit into two optical paths;

a first optical system disposed on one of the two optical paths, for forming an image twice;

a first observation means disposed at a final imaging position for said first optical system;

a second optical system disposed on a remainder of the two optical paths, having a higher total magnification and a larger numerical aperture than said first optical system;

second observation means disposed at an imaging position of said second optical system; and a stop, disposed at a pupil position of said first optical system, constructed to reduce a numerical aperture at low magnification.

2. An observation optical apparatus according to claim 1, wherein said first optical system further comprises a first lens unit with a positive refracting power;

a second lens unit for forming a pupil through an intermediate image position where an intermediate image is formed by said first lens unit;

a stop disposed at a position of the pupil;

and a third lens unit with a positive refracting power.

3. An observation optical apparatus according to claim 1, further comprising:

a second path splitter disposed between said first path splitter and said second optical system;

a third optical system for detecting a focus automatically;

said objective unit including an infinite objective lens movable along the optical axis;

and said second optical system including an imaging lens, wherein infrared light is projected on a surface of an object from said third optical system through said objective unit and an amount of light reflected from the object is detected through said third optical system, thereby moving said objective unit along the optical axis to focus automatically.

4. An observation optical apparatus according to claim 3; wherein said first optical system further comprises a first lens unit having a positive refracting power;

a second lens unit having a meniscus lens directing a concave surface toward the object through an intermediate image position, for forming a pupil;

a variable stop disposed at a position of the pupil; and the third lens unit having a positive refracting power.

5. An observation optical apparatus according to claim 4, wherein said variable stop is movable along the optical axis in association with a shift of the pupil position caused by a magnification change.

6. An observation optical apparatus according to claim 4, wherein said variable stop is movable along the optical axis in association with a shift of the pupil position of said first optical system caused by a movement of said objective unit.

7. An observation optical apparatus according to claim 1, further comprising third path splitting means disposed between said objective unit and said first path splitter;

a fourth optical system for coaxial vertical illumination;

a first polarizing plate disposed in said fourth optical system;

a second polarizing plate disposed on an image side of said third path splitting means; and one of a depolarizing plate, a wave plate, and a ¼ wave plate mounted at a top of said object unit, wherein flare caused by a surface reflection of said objective unit is eliminated by said first polarizing plate, said second polarizing plate, and one of a depolarizing plate, a wave plate, and a ¼ wave plate.

8. An observation optical apparatus comprising:

an objective unit;

a first path splitter disposed on an optical axis of said objective unit, constructed to split an optical path from said objective unit into two optical paths;

a first optical system disposed on one of the two optical paths, for forming an image exactly twice;

first observation means disposed at a final imaging position of said first optical system;

a second optical system disposed on a remainder of the two optical paths, having a higher total magnification and a larger numerical aperture than said first optical system;

a second observation means disposed at an imaging position of said second optical system; and a stop disposed at a pupil position of said first optical system constructed to reduce a numerical aperture at low magnification.

9. An observation optical apparatus according to claim 8, wherein said first optical system further comprises:

a first lens unit with a positive refracting power;

a second lens unit for forming a pupil through an intermediate image position where an intermediate image is formed by said first lens unit;

a stop disposed at a position of the pupil; and a third lens unit with a positive refracting power.

10. An observation optical apparatus according to claim 8, further comprising:

a second path splitter disposed between said first path splitter and said second optical system;

a third optical system for detecting a focus automatically;

said objective unit including an infinite objective lens movable along the optical axis and said second optical system including an imaging lens, and wherein infrared light is projected on a surface of an object from said third optical system through said objective unit and an amount of light reflected from the object is detected through said third optical system, thereby moving said objective unit along the optical axis to focus automatically.

11. An observation optical apparatus according to claim 10, wherein said first optical system further comprises:

a first lens unit having a positive refracting power;

a second lens unit having a meniscus lens directing a concave surface toward the object through an intermediate image position, for forming a pupil;

a variable stop disposed at a position of the pupil; and the third lens unit having a positive refracting power.

12. An observation optical apparatus according to claim 11, wherein said variable stop is movable along the optical axis in association with a shift of the pupil position caused by a magnification change.

13. An observation optical apparatus according to claim 11, wherein said variable stop is movable along the optical axis in association with a shift of the pupil position of said first optical system caused by a movement of said objective unit.

14. An observation optical apparatus according to claim 8, further comprising:

a third path splitter disposed between said objective unit and said first path splitter;

a fourth optical system for coaxial vertical illumination;

a first polarizing plate disposed in said fourth optical system;

a second polarizing plate disposed on an image side of said third path splitting means; and one of a depolarizing plate, a wave plate, and a ¼ wave plate, mounted at a top of said objective unit, wherein flare caused by a surface reflection of said objective unit is eliminated by said first polarizing plate, said second polarizing plate, and one of a depolarizing plate, a wave plate, and a ¼ wave plate.

* * * * *